United States Patent
Nakano et al.

(10) Patent No.: US 11,199,238 B2
(45) Date of Patent: Dec. 14, 2021

(54) HYDRAULIC DAMPING DEVICE

(71) Applicant: Showa Corporation, Gyoda (JP)

(72) Inventors: Gota Nakano, Gyoda (JP); Kazunari Maeda, Gyoda (JP); Hiroshi Endo, Gyoda (JP); Seiryo Konakai, Gyoda (JP)

(73) Assignee: Showa Corporation, Gyoda (JP)

( * ) Notice: Subject to any disclaimer, the term of this patent is extended or adjusted under 35 U.S.C. 154(b) by 69 days.

(21) Appl. No.: 16/484,031

(22) PCT Filed: May 10, 2017

(86) PCT No.: PCT/JP2017/017707
§ 371 (c)(1),
(2) Date: Aug. 6, 2019

(87) PCT Pub. No.: WO2018/163444
PCT Pub. Date: Sep. 13, 2018

(65) Prior Publication Data
US 2019/0390731 A1    Dec. 26, 2019

(30) Foreign Application Priority Data

Mar. 9, 2017 (JP) .............................. JP2017-045483

(51) Int. Cl.
*F16F 9/50* (2006.01)
*F16F 9/348* (2006.01)
(Continued)

(52) U.S. Cl.
CPC ................ *F16F 9/348* (2013.01); *F16F 9/18* (2013.01); *F16F 9/3484* (2013.01); *B60G 13/08* (2013.01);
(Continued)

(58) Field of Classification Search
CPC .... F16F 9/062; F16F 9/18; F16F 9/185; F16F 9/187; F16F 9/34; F16F 9/3405;
(Continued)

(56) References Cited

U.S. PATENT DOCUMENTS 2,697,496 A * 12/1954 McIntyre .............. F16F 9/3484
188/280
3,552,429 A *  1/1971 Dickinson ............. F16F 9/3214
137/493.8
(Continued)

FOREIGN PATENT DOCUMENTS

CN         103115103 A      5/2013
CN         104343766 A      2/2015
(Continued)

OTHER PUBLICATIONS

English abstract for DE 3109122 (no date).*
(Continued)

*Primary Examiner* — Nicholas J Lane
(74) *Attorney, Agent, or Firm* — Leason Ellis LLP

(57) ABSTRACT

The hydraulic damping device includes: a cylinder storing fluid; a piston configured to form a channel through which the fluid flows along with relative movement of a rod relative to the cylinder in a specific direction; a valve having elasticity, the valve being configured to open and close the channel in the piston; a movement permitting part configured to permit the valve to move between a contact position and a spaced position, the contact position being a position where the valve contacts the piston, the spaced position being a position where the valve is spaced from the piston; a restricting part configured to restrict bending of the valve at the spaced position; and an imparting part having elasticity, the imparting part being configured to impart, to the
(Continued)

valve, a load that is uneven in a circumferential direction of the valve and directed toward the piston.

2 Claims, 10 Drawing Sheets

(51) Int. Cl.
 F16F 9/18 (2006.01)
 B60G 13/08 (2006.01)
 B60G 17/08 (2006.01)
(52) U.S. Cl.
 CPC .......... B60G 17/08 (2013.01); B60G 2202/24 (2013.01); B60G 2500/10 (2013.01); F16F 9/185 (2013.01); F16F 2222/12 (2013.01)
(58) Field of Classification Search
 CPC ........ F16F 9/348; F16F 9/3481; F16F 9/3482; F16F 9/3484; F16F 9/3485; F16F 9/3488
 See application file for complete search history.

(56) References Cited

U.S. PATENT DOCUMENTS

| | | | |
|---|---|---|---|
| 5,085,300 A * | 2/1992 | Kato | F16F 9/348 188/280 |
| 8,042,661 B2 * | 10/2011 | Ota | F16F 9/3485 188/322.15 |
| 2004/0129517 A1 | 7/2004 | Murata | |
| 2005/0092565 A1 * | 5/2005 | Asadi | F16F 9/3484 188/322.15 |
| 2013/0025446 A1 * | 1/2013 | Ashiba | F16F 9/3485 91/418 |
| 2014/0138931 A1 * | 5/2014 | Endo | F16F 9/348 280/124.157 |
| 2015/0034182 A1 | 2/2015 | Ashiba | |
| 2016/0356335 A1 * | 12/2016 | Nomura | F16F 9/3485 |
| 2020/0080613 A1 * | 3/2020 | Nakano | F15B 15/22 |

FOREIGN PATENT DOCUMENTS

| | | | | |
|---|---|---|---|---|
| DE | 3109122 A1 * | 9/1982 | ............ | F16F 9/3484 |
| DE | 102009033301 A1 | 7/2010 | | |
| JP | 03-035341 U | 4/1991 | | |
| JP | 03-168429 A | 7/1991 | | |
| JP | 06-280919 A | 10/1994 | | |
| JP | 06280919 A * | 10/1994 | | |
| JP | 11-51105 A | 2/1999 | | |
| JP | 2002-195335 A | 7/2002 | | |
| JP | 2004-211878 A | 7/2004 | | |
| JP | 2013-029133 A | 2/2013 | | |

OTHER PUBLICATIONS

Machine translation of JP 06-280919 (no date).*
International Search Report dated Aug. 1, 2017 for the corresponding International Patent Application No. PCT/JP2017/017707.
German Office Action dated Oct. 6, 2021 for the corresponding German Patent Application No. 112017007209.3.

* cited by examiner

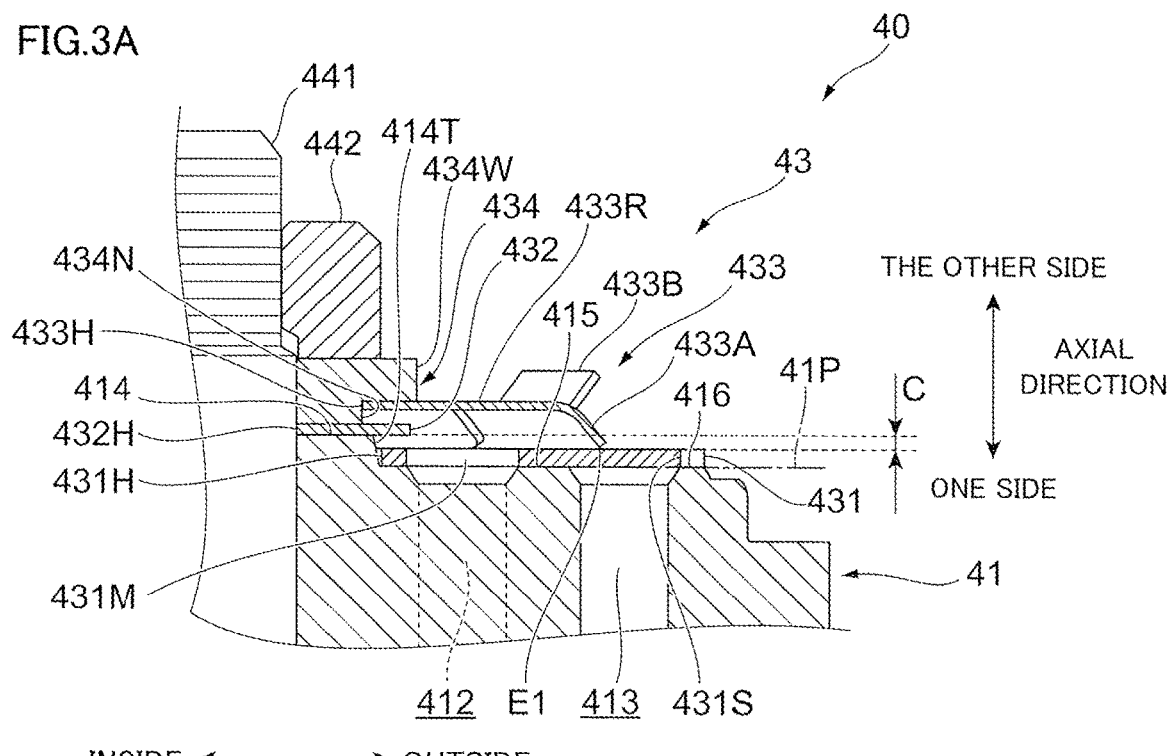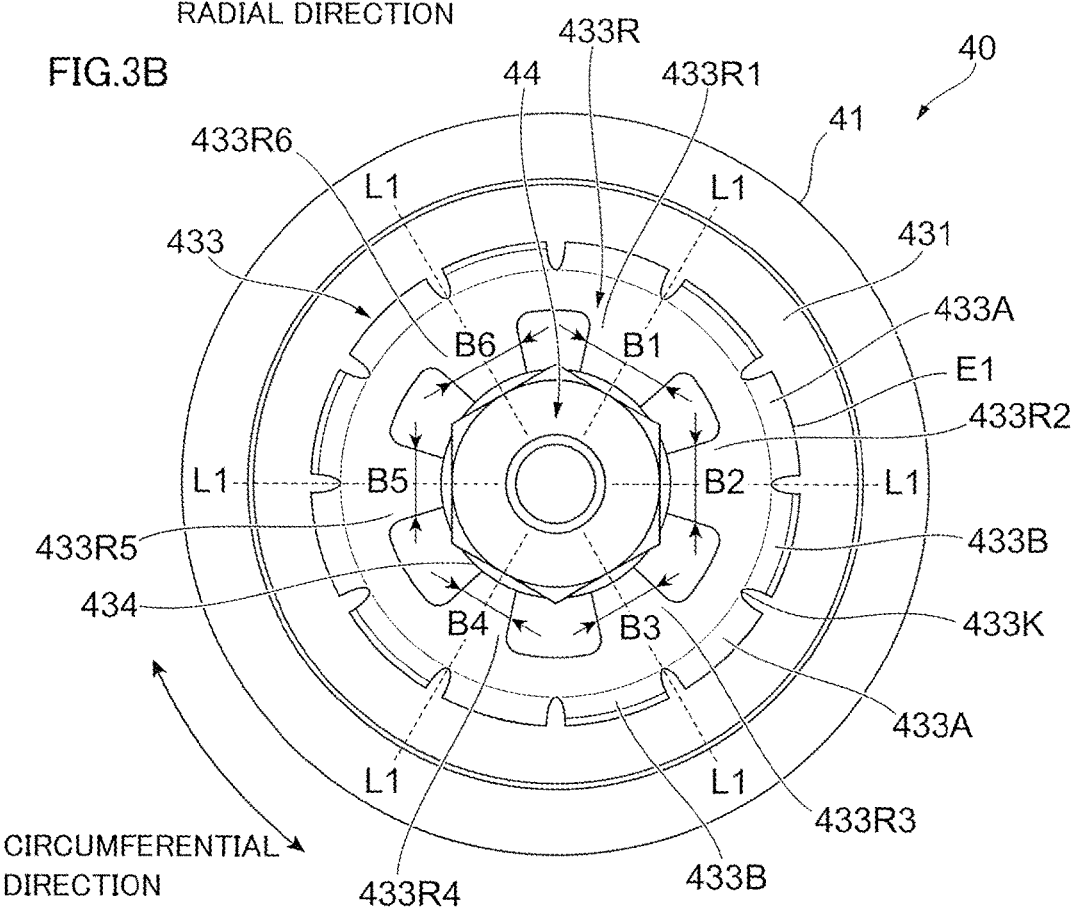

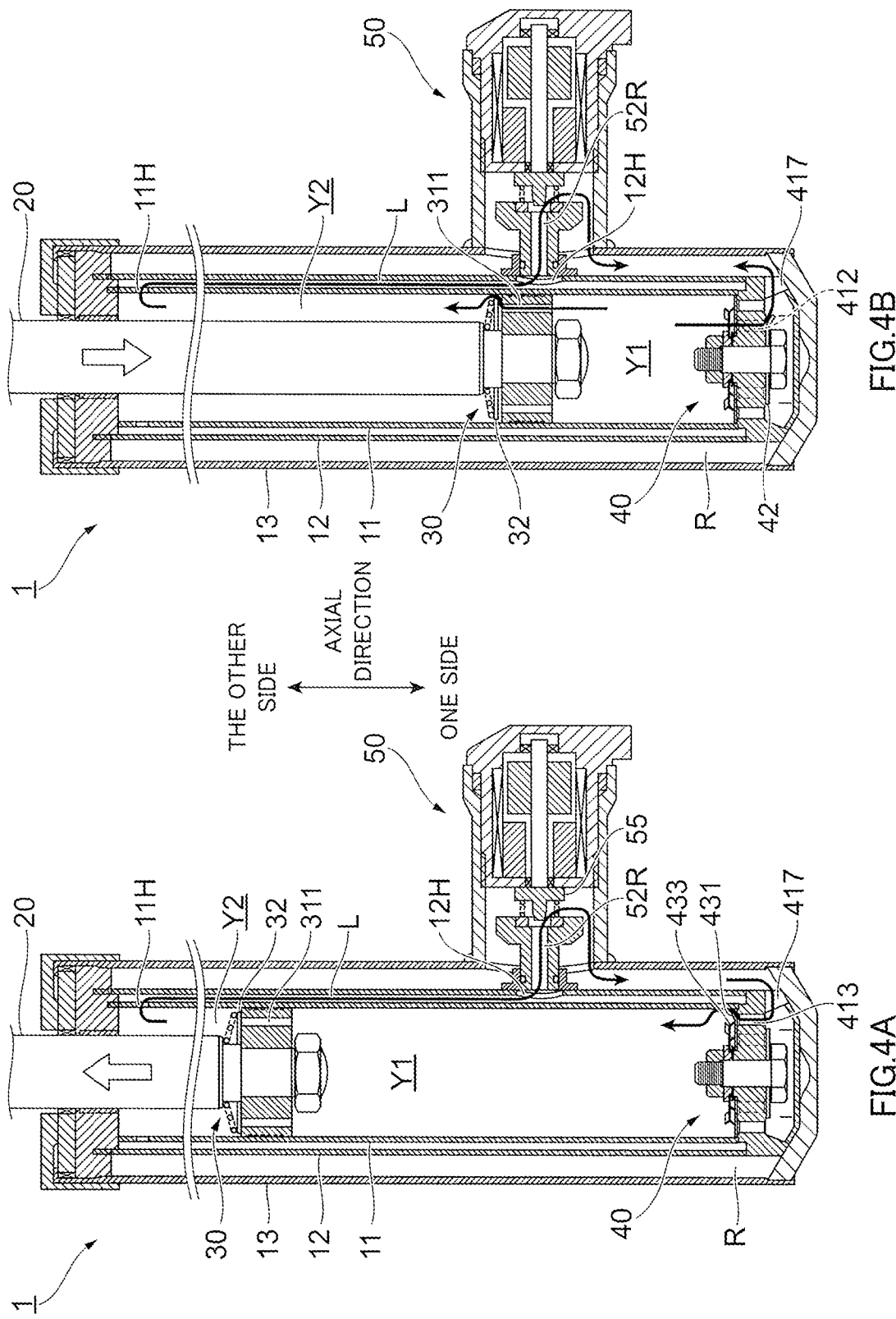

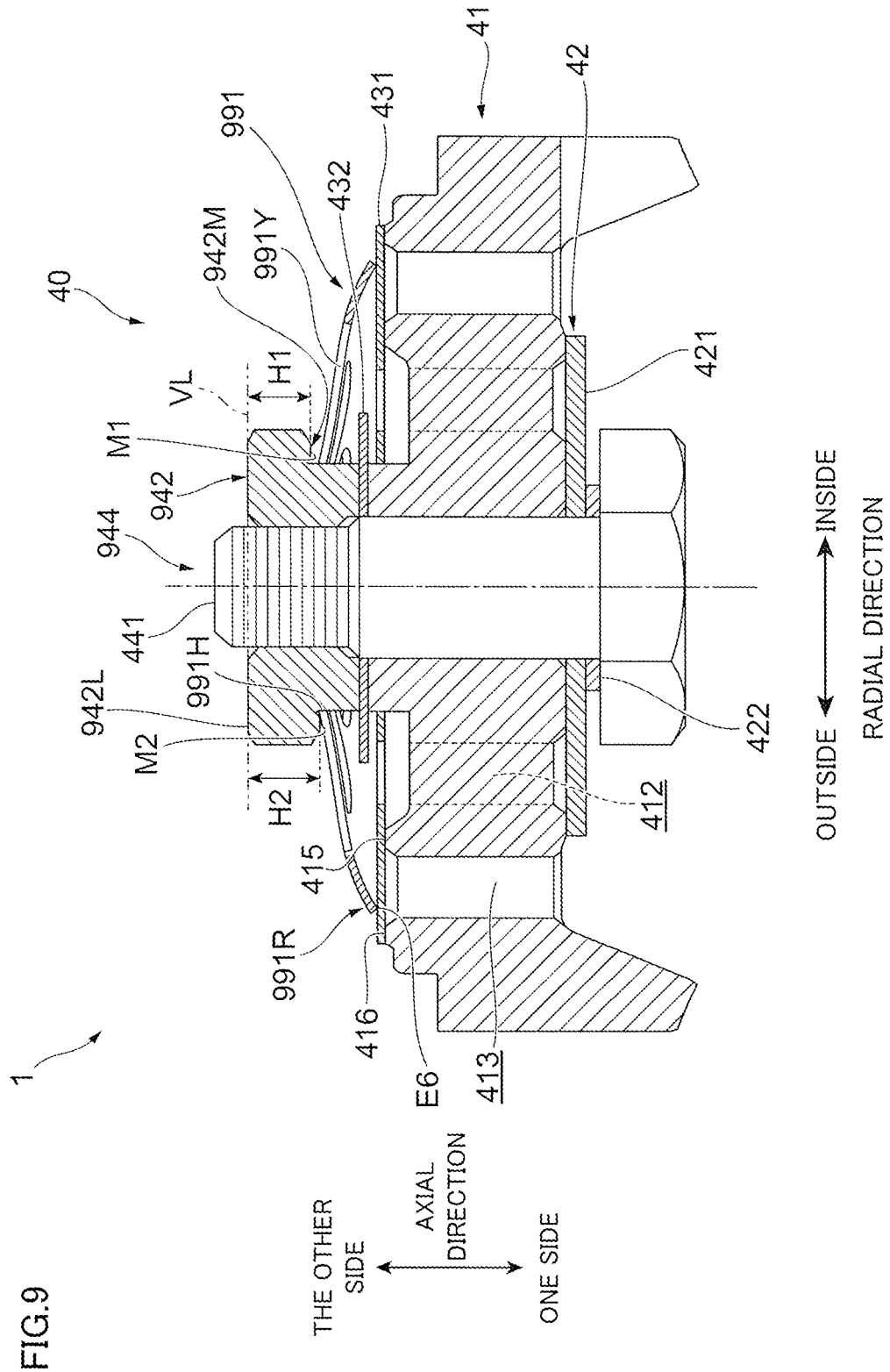

HYDRAULIC DAMPING DEVICE

CROSS-REFERENCE TO RELATED PATENT APPLICATIONS

This application is a U.S. National Phase Application under 35 U.S.C. § 371 of International Patent Application No. PCT/JP2017/017707, filed May 10, 2017, and claims the benefit of Japanese Patent Application No. 2017-045483, filed Mar. 9, 2017, all of which are incorporated herein by reference in their entirety. The International Application was published in Japanese on Sep. 13, 2018 as International Publication No. WO/2018/163444 under PCT Article 21(2).

FIELD OF THE INVENTION

The present invention relates to a hydraulic damping device.

BACKGROUND OF THE INVENTION

There is known a hydraulic damping device that performs damping by fluid. For example, Japanese Patent Application Laid-Open Publication No. 2004-211878 discloses a bottom valve device, wherein a channel is formed in a bottom piece, a check valve for opening and closing the channel is provided on one surface of the bottom piece, and a coil spring for bouncing the check valve is fastened by a bolt and a nut provided to the bottom piece. In the bottom valve device, a screw direction of the nut (or the bolt) fastening the coil spring is opposite to a winding direction of the coil spring.

Technical Problem

When the hydraulic damping device uses a valve that controls the flow of fluid by moving its position, the valve may suddenly move under a large pressure of the fluid and thus contact other components of the hydraulic damping device. This may generate sound.

An object of the present invention is to reduce sound due to fluid flow control by the valve.

SUMMARY OF THE INVENTION

Solution to Problem

With the above object in view, the present invention is a hydraulic damping device including: a cylinder storing fluid; a piston configured to form a channel through which the fluid flows along with relative movement of a rod relative to the cylinder in a specific direction; a valve having elasticity, the valve being configured to open and close the channel in the piston; a movement permitting part configured to permit the valve to move between a contact position and a spaced position, the contact position being a position where the valve contacts the piston, the spaced position being a position where the valve is spaced from the piston; a restricting part configured to restrict bending of the valve at the spaced position; and an imparting part having elasticity, the imparting part being configured to impart, to the valve, a load that is uneven in a circumferential direction of the valve and directed toward the piston.

Advantageous Effects of Invention

According to the present invention, it is possible to reduce sound due to fluid flow control by the valve.

BRIEF DESCRIPTION OF THE DRAWINGS

FIG. 3A is a partial cross-sectional view of the bottom piston unit of the first embodiment, and FIG. 3B is a top view of the bottom piston unit of the first embodiment.

FIGS. 4A and 4B are explanatory diagrams of how the hydraulic damper of the first embodiment works.

FIG. 9 is an explanatory diagram of the hydraulic damper of the sixth embodiment.

DETAILED DESCRIPTION OF THE INVENTION

Embodiments of the present invention will be described below in detail with reference to the attached drawings.

First Embodiment

[Structure and Function of the Hydraulic Damper 1]

Figure 1:
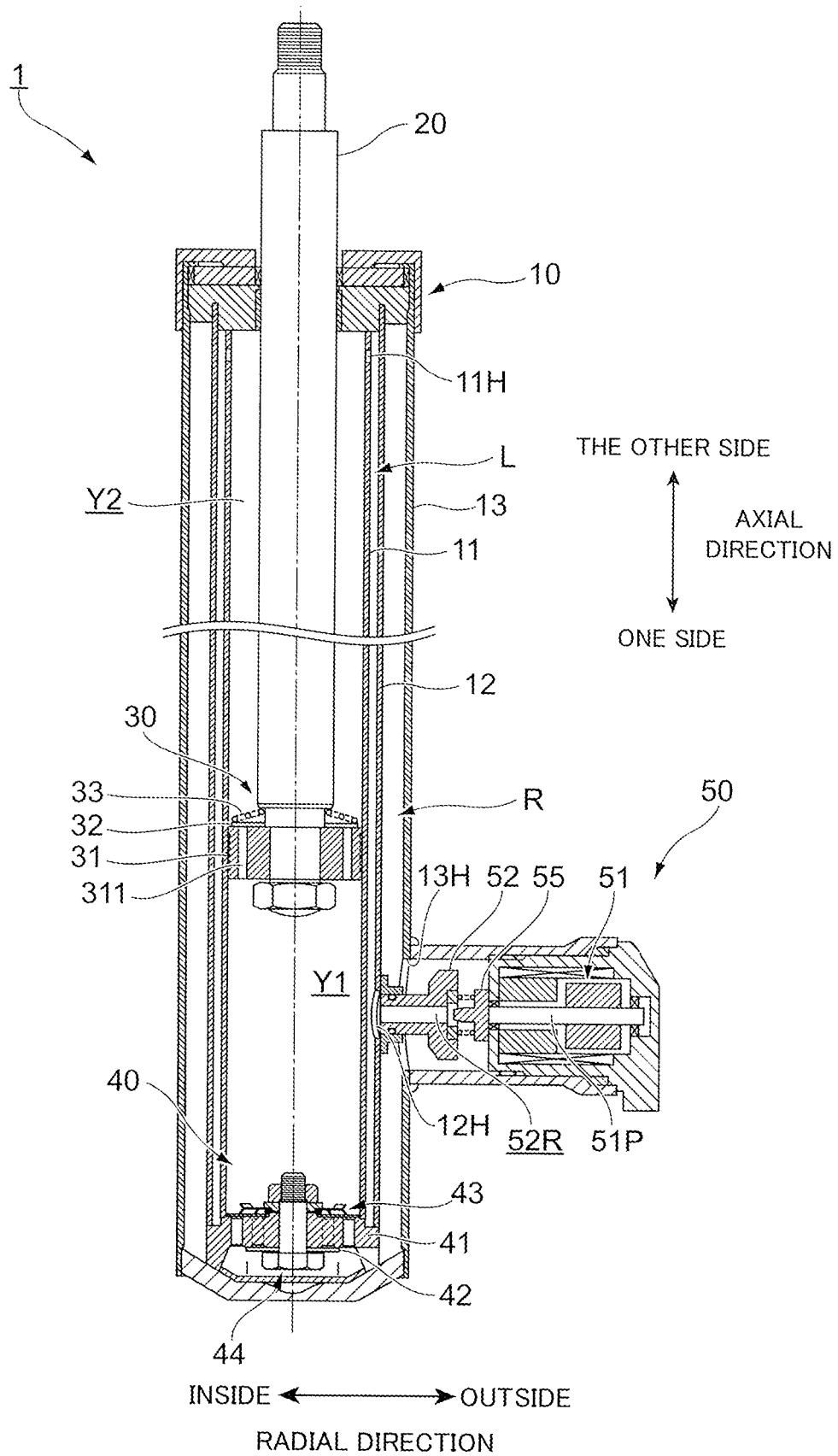
FIG. 1 is an entire view of a hydraulic damper of the first embodiment.

FIG. 1 is an entire view of a hydraulic damper 1 of the first embodiment.

As shown in FIG. 1, the hydraulic damper 1 (an example of the hydraulic damping device) includes a cylinder unit 10 storing oil, and a rod 20. One end of the rod 20 is inserted into the cylinder unit 10 such that the rod 20 can slide within the cylinder unit 10, and the other end of the rod 20 protrudes from the cylinder unit 10. The hydraulic damper 1 further includes a piston unit 30 disposed at the one end of the rod 20, a bottom piston unit 40 disposed at one end of the cylinder unit 10, and a damping force changer 50 disposed outside of the cylinder unit 10 in the radial direction.

In the following description, the longitudinal direction of the hydraulic damper 1 shown in FIG. 1 may be referred to as an "axial direction". The lower side in the axial direction may be referred to as "one side", and the upper side of the hydraulic damper 1 may be referred to as "the other side". Also, the lateral direction of the hydraulic damper 1 shown in FIG. 1 may be referred to as a "radial direction". Further, the side radially closer to the centerline may be referred to as an "inside in the radial direction", and the side radially away from the centerline may be referred to as an "outside in the radial direction". Further, the rotational direction of the hydraulic damper 1 about the axial direction may be referred to as a "circumferential direction".

[Structure and Function of the Cylinder Unit 10]

The cylinder unit 10 includes a cylinder 11, an outer cylinder body 12 disposed at the outside of the cylinder 11 in the radial direction, and a damper case 13 disposed at the outside of the outer cylinder body 12 in the radial direction.

The cylinder 11 has a cylindrical shape and includes a cylinder opening 11H at the other side.

The outer cylinder body 12 forms a communication path L between the outer cylinder body 12 and the cylinder 11. Also, the outer cylinder body 12 includes an outer cylinder body opening 12H at a position facing the damping force changer 50.

The damper case 13 forms a reservoir chamber R between the damper case 13 and the outer cylinder body 12. The reservoir chamber R retains oil. Along with movement of the rod 20 relative to the cylinder 11, the reservoir chamber R absorbs oil in the cylinder 11 (the first oil chamber Y1) or supplies oil into the cylinder 11 (the first oil chamber Y1). Further, the reservoir chamber R retains oil flowing out of the damping force changer 50. The damper case 13 includes a case opening 13H at a position facing the damping force changer 50.

[Structure and Function of the Rod 20]

The rod 20 is a rod-like member extending in the axial direction. The rod 20 connects to the piston unit 30 at the one side. Also, the rod 20 connects to a vehicle body at the other side via a coupling member or the like (not shown in the figure)

[Structure and Function of the Piston Unit 30]

The piston unit 30 includes a piston body 31 having multiple piston oil ports 311, a piston valve 32 opening and closing the other side of the piston oil ports 311, and a spring 33 interposed between the piston valve 32 and the one side end of the rod 20. The piston unit 30 partitions the oil chamber within the cylinder 11 into the first oil chamber Y1 and the second oil chamber Y2.

[Structure and Function of the Bottom Piston Unit 40]

The bottom piston unit 40 includes a valve seat 41 (an example of the piston), a damping valve unit 42 at the one side of the valve seat 41, a check valve unit 43 at the other side of the valve seat 41, and a fixing member 44 provided in the axial direction. The bottom piston unit 40 provides a partition between the first oil chamber Y1 and the reservoir chamber R.

The valve seat 41, the damping valve unit 42, the check valve unit 43, and the fixing member 44 of the bottom piston unit 40 will be described in detail later.

[Structure and Function of the Damping Force Changer 50]

The damping force changer 50 includes a solenoid unit 51, a connecting channel member 52, and a solenoid valve 55.

The solenoid unit 51 advances or retracts a plunger 51P according to control by a controller (not shown in the figure).

The connecting channel member 52 is a substantially cylindrical member having a connecting channel 52R inside thereof.

The solenoid valve 55 changes a cross-sectional area of oil flow within the connecting channel 52R by moving the position of the solenoid valve 55 relative to the connecting channel member 52. Thus, the solenoid valve 55 throttles the flow of oil within the connecting channel 52R.

In the first embodiment, damping force in the hydraulic damper 1 is mainly generated by throttling of the oil flow by the solenoid valve 55.

Figure 2:
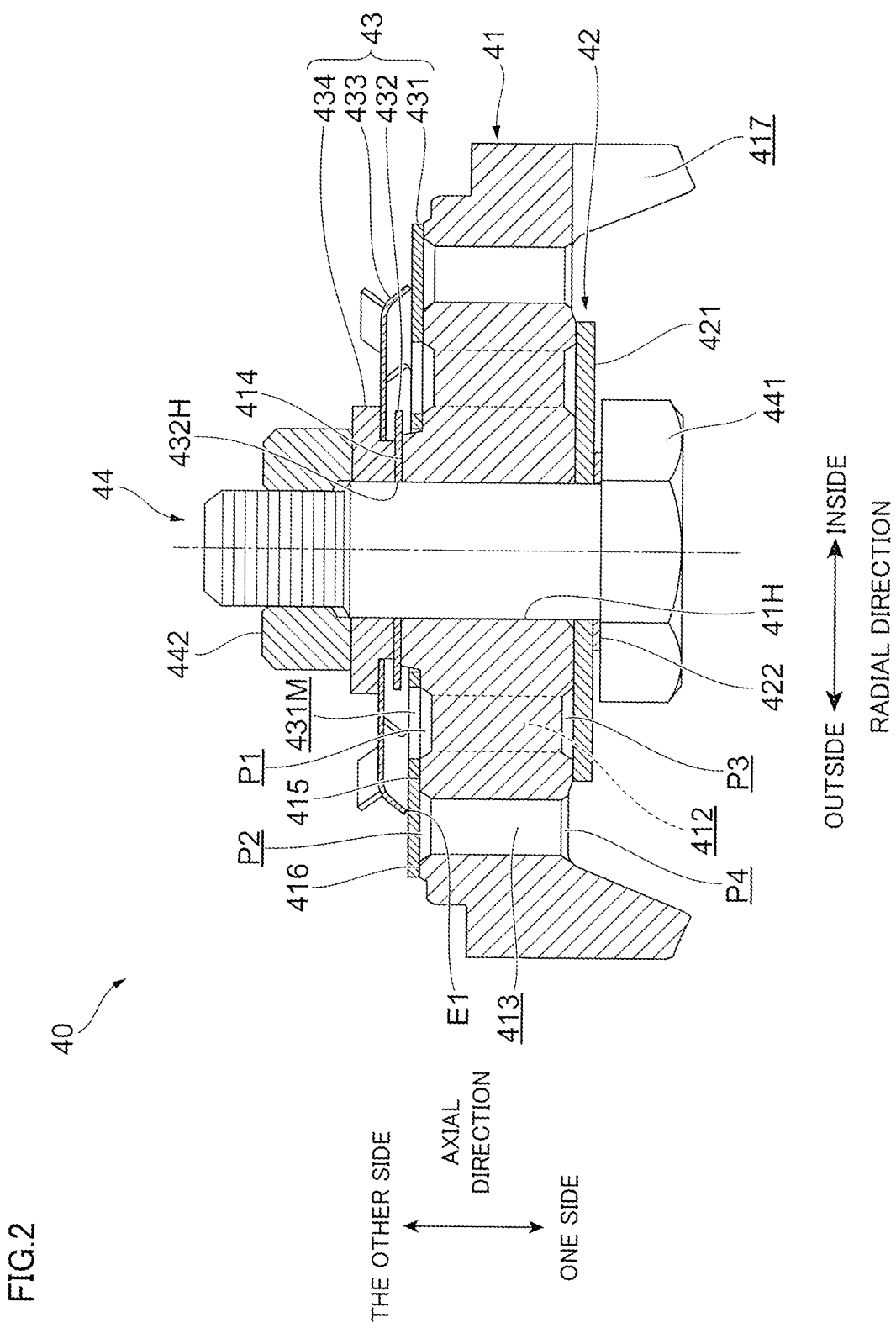
FIG. 2 is a cross-sectional view of a bottom piston unit of the first embodiment.

FIG. 2 is a cross-sectional view of a bottom piston unit 40 of the first embodiment.

FIG. 3A is a partial cross-sectional view of the bottom piston unit 40 of the first embodiment, and FIG. 3B is a top view of the bottom piston unit 40 of the first embodiment.

(Valve Seat 41)

As shown in FIG. 2, the valve seat 41 includes a through-hole 41H at the inside in the radial direction, compression-side oil paths 412 at the outside of the through-hole 41H in the radial direction, extension-side oil paths 413 at the outside of the compression-side oil paths 412 in the radial direction. The valve seat 41 further includes a holding structure 414 at the other side, an inner round part 415 (an example of the inner annular part) at the other side, and an outer round part 416 (an example of the outer annular part) at the other side. The valve seat 41 further includes a reservoir channel part 417 at the one side.

The through-hole 41H extends in the radial direction of the valve seat 41. The through-hole 41H allows for insertion of the fixing member 44.

Multiple (four in the present embodiment) compression-side oil paths 412 are arranged at substantially equal intervals in the circumferential direction. Each compression-side oil path 412 includes a first other-side oil port P1 at its end on the other side and a first one-side oil port P3 at its end on the one side.

Each compression-side oil path 412 permits flow of oil between the first oil chamber Y1 and the reservoir chamber R during a compression stroke of the hydraulic damper 1 (see FIG. 1).

Multiple (four in the present embodiment) extension-side oil paths 413 are arranged at substantially equal intervals in the circumferential direction. Each extension-side oil path 413 includes a second other-side oil port P2 at its end on the other side and a second one-side oil port P4 at its end on the one side.

Each extension-side oil path 413 permits flow of oil between the reservoir chamber R and the first oil chamber Y1 during an extension stroke of the hydraulic damper 1 (see FIG. 1).

The holding structure 414 (an example of the movement permitting part) is formed substantially annularly around an outer periphery of the through-hole 41H. The holding structure 414 protrudes to the other side in the axial direction. The holding structure 414 forms a space (gap C described later) that permits the check valve 431 to move in the axial direction.

As shown in FIG. 3A, a side 414T of the holding structure 414 of the first embodiment is tapered. Specifically, the holding structure 414 has an outer diameter gradually narrowing from the one side toward the other side. In the first embodiment, this allows the check valve 431 (described later) to move smoothly in the axial direction.

The inner round part 415 is annularly formed at the outside of the first other-side oil ports P1 in the radial direction and at the inside the second other-side oil ports P2 in the radial direction (see FIG. 2). The inner round part 415 protrudes to the other side in the axial direction. The inner round part 415 of the first embodiment forms a contact area with the check valve 431 (described later). Additionally, the inner round part 415 works with the check valve 431 (described later) to prevent flow of oil between the first other-side oil port P1 and the second other-side oil port P2 (see FIG. 2).

The outer round part 416 is annularly formed at the outside of the second other-side oil ports P2 in the radial direction (see FIG. 2). The outer round part 416 protrudes to the other side in the axial direction. The height of protrusion of the outer round part 416 in the axial direction is slightly higher than that of the inner round part 415. The outer round part 416 forms a contact area with the check valve 431 (described later).

In the first embodiment, the plane passing through the inner round part 415 and the outer round part 416 is referred to as a round plane 41P.

The reservoir channel part 417 is an opening formed at the one side end. The reservoir channel part 417 faces the first one-side oil ports P3, the damping valve unit 42, and the second one-side oil ports P4 at the inside in the radial direction. Also, the reservoir channel part 417 communicates with the reservoir chamber R (see FIG. 1) at the outside in the radial direction.

(Damping Valve Unit 42)

As shown in FIG. 2, the damping valve unit 42 includes a damping valve 421 and a compression-side seat ring 422 at the one side of the damping valve 421.

The damping valve 421 is a disk-like metal plate through which the fixing member 44 penetrates at the inside in the radial direction. The outer periphery of the damping valve 421 is positioned at the outside of the first one-side oil ports P3 in the radial direction and at the inside of the second one-side oil ports P4 in the radial direction.

In the first embodiment, the damping valve 421 has a thickness larger than a thickness of the check valve 431 (described later).

The damping valve 421 configured as above opens and closes the first one-side oil ports P3, and leaves the second one-side oil ports P4 always open.

The compression-side seat ring 422 is a disk-like metal plate through which the fixing member 44 penetrates at the inside in the radial direction. The compression-side seat ring 422 has an outer diameter smaller than that of the damping valve 421. The compression-side seat ring 422 secures a space for deformation of the damping valve 421 to the one side.

The damping valve 421 may be comprised of multiple (e.g., three) metal plates. In this case too, the total thickness of the damping valve 421 is made larger than the thickness of the check valve 431 (described later).

(Check Valve Unit 43)

As shown in FIG. 2, the check valve unit 43 includes the check valve 431 (an example of the valve) at the other side of the valve seat 41, a check valve stopper 432 (an example of the restricting part) at the other side of the check valve 431, an imparting member 433 (an example of the imparting part) at the other side of the check valve stopper 432, and a collar member 434 at the other side of the imparting member 433.

As shown in FIG. 3A, the check valve 431 is a disk-like metal plate including an opening 431H at the inside in the radial direction. The opening 431H allows for insertion of the holding structure 414. The outer periphery of the check valve 431 is located above the outer round part 416.

The outer periphery of the check valve 431 may be located at the outside of the outer round part 416 in the radial direction.

The check valve 431 includes check valve oil ports 431M at the outside of the opening 431H in the radial direction, and a slit 431S at the outside of the check valve oil ports M in the radial direction.

The check valve oil ports 431M are formed at positions radially corresponding to the respective first other-side oil port P1. Multiple check valve oil ports M are provided. The check valve oil ports 431M face the respective first other-side oil ports P1.

The slit 431S is formed by cutting out the outer periphery of the check valve 431 to the inside in the radial direction. The slit 431S faces the outer round part 416. When the rod 20 moves during an extension stroke so slowly that the check valve 431 does not deform entirely and keeps the second other-side oil ports P2 almost closed, the slit 431S permits flow of oil through the extension-side oil paths 413.

The check valve 431 configured as above opens and closes the second other-side oil ports P2, and leaves the first other-side oil ports P1 always open. The check valve 431 of the first embodiment restricts flow of oil through the extension-side oil paths 413 during movement of the rod 20 to the one side, and permits flow of oil through the extension-side oil paths 413 during movement of the rod 20 to the other side.

In the hydraulic damper 1 of the first embodiment, the check valve 431 serves as a member to switch flow of oil through the extension-side oil paths 413, and is not particularly intended to generate a damping force.

As shown in FIG. 3A, the check valve stopper 432 is a substantially annular disk-like metal plate including an opening 432H at the inside in the radial direction. The opening 432H allows for insertion of the fixing member 44. As shown in FIG. 3A, the check valve stopper 432 has a larger outer diameter than that of the holding structure 414. The check valve stopper 432 hence protrudes to the outside in the radial direction relative to the holding structure 414.

The check valve stopper 432 is spaced from the round plane 41P of the valve seat 41 with a predetermined gap C in the axial direction. This allows the check valve 431 to move between a contact position contacting the round plane 41P and a spaced position spaced from the round plane 41P.

The check valve stopper 432 restricts bending of the check valve 431 at the spaced position away from the round plane 41P.

In the first embodiment, the contact position refers to a position where the entire check valve 431 contacts the round plane 41P, and the spaced position refers to a position where the entire check valve 431 is away from the round plane 41P.

Movement of the check valve 431 may be regarded as displacement of the check valve 431 as a whole in the axial direction. Movement of the check valve 431 may further be regarded as displacement of the check valve 431 without involving its deformation.

Deformation of the check valve 431 may be regarded as deformation of its radially outward portion (at least including the portion facing the second other-side oil port P2) with its radially inward portion (the portion closer to the opening 432H) being situated at the spaced position.

As shown in FIG. 3A, the imparting member 433 includes an opening 433H at the inside in the radial direction to allow for insertion of the fixing member 44 and the collar member 434. The imparting member 433 has elasticity. The imparting member 433 may be made of metal, such as iron.

The imparting member 433 imparts, to the check valve 431, the load that is uneven in the circumferential direction of the check valve 431 and directed toward to the valve seat 41. The imparting member 433 will be described in detail below.

As shown in FIG. 3B, the imparting member 433 includes first outer protrusions 433A (examples of the contacting part), second outer protrusions 433B, and held parts 433R.

The first outer protrusions 433A protrude to the outside in the radial direction and to the one side. Multiple first outer protrusions 433A are arranged at substantially equal intervals in the circumferential direction. The first outer protrusions 433A contact the other side surface of the check valve 431 at their contacting ends E1 (see FIG. 3A).

The second outer protrusions 433B protrude to the outside in the radial direction and to the other side. Multiple second outer protrusions 433B are arranged at substantially equal intervals in the circumferential direction.

In the first embodiment, each of the second outer protrusions 433B has a free end that does not contact other components. In the first embodiment, the first outer protrusions 433A and the second outer protrusions 433B are symmetrical to each other. This ensures that the imparting member 433 can work in the same manner even if the imparting member 433 is assembled upside down from how the pressing member 433 is assembled in the first embodiment.

The first outer protrusions 433A and the second outer protrusions 433B are alternately arranged in the circumferential direction. A notch 433K is formed between the adjacent first outer protrusion 433A and second outer protrusion 433B.

As shown in FIG. 3A, in the first embodiment, the contacting ends E1 of the respective first outer protrusions 433A of the imparting member 433 contact the check valve 431 at an area that is outside of the inner round part 415 in the radial direction and inside of the outer round part 416 in the radial direction.

The held parts 433R of the first embodiment consist of multiple structure parts. In the description below, these structure parts are respectively referred to as a first structure part 433R1, a second structure part 433R2, a third structure part 433R3, a fourth structure part 433R4, a fifth structure part 433R5, and a sixth structure part 433R6. When these structure parts are not distinguished from each other, they are collectively referred to as the structure parts of the held parts 433R.

The structure parts of the held parts 433R protrude to the inside in the radial direction. Each structure part is tapered such that its circumferential width narrows from the outside in the radial direction toward the inside in the radial direction. The structure parts have the same tapered angle. Also, the structure parts are arranged such that radial lines L1 passing through the center of the respective structure parts are at substantially equal intervals in the circumferential direction.

The structure parts of the held parts 433R are positioned to face the respective notches 433K. Specifically, the structure parts are aligned with the respective notches 433K in the radial direction.

As shown in FIG. 3A, radially inward portions of the held parts 433R are held between the check valve stopper 432 and the collar member 434.

In the first embodiment, the structure parts of the held parts 433R have different circumferential widths. This varies the circumferential strength of the held parts 433R of the imparting member 433 of the first embodiment. The imparting member 433 of the first embodiment thus imparts, to the check valve 431, the load that is uneven in the circumferential direction of the check valve 431 and directed toward to the valve seat 41. The circumferential width of each held part 433R will be described in detail below.

In the first embodiment, the width B1 of the first structure part 433R1 is larger than the other held parts 433R. The width B4 of the fourth structure part 433R4 is smaller than the other held parts 433R.

In a clockwise direction of FIG. 3B, the width B1 of the first structure part 433R1 is largest, followed by the width B2 of the second structure part 433R2, the width B3 of the third structure part 433R3, and the width B4 of the fourth structure part 433R4 in this order.

In a counterclockwise direction of FIG. 3B, the width B1 of the first structure part 433R1 is largest, followed by the width B6 of the sixth structure part 433R6, the width B5 of the fifth structure part 433R5, and the width B4 of the fourth structure part 433R4 in this order.

The width B2 of the second structure part 433R2 and the width B6 of the sixth structure part 433R6 are substantially the same. The width B3 of the third structure part 433R3 and the width B5 of the fifth structure part 433R5 are substantially the same.

As described above, the multiple held parts 433R of the first embodiment have uneven circumferential widths.

In the hydraulic damper 1 of the first embodiment, the check valve 431 serves as a member to switch flow of oil through the extension-side oil paths 413, and is not particularly intended to generate a damping force.

As shown in FIG. 3A, the collar member 434 includes a small diameter portion 434N and a large diameter portion 434W at the other side of the small diameter portion 434N. The collar member 434 is a separate component from a nut 442 (described later) of the fixing member 44.

The small diameter portion 434N contacts the check valve stopper 432 at the one side. The small diameter portion 434N also contacts the held parts 433R of the imparting member 433 in the radial direction. The small diameter portion 434N thus defines the position of the imparting member 433 in the radial direction.

The large diameter portion 434W protrudes to the outside in the radial direction further than the small diameter portion 434N. The large diameter portion 434W faces the other side of the held parts 433R of the imparting member 433.

(Fixing Member 44)

As shown in FIG. 2, the fixing member 44 includes a bolt 441 at the one side and a nut 442 at the other side. The fixing member 44 fixes the damping valve unit 42 and the check valve unit 43 to the valve seat 41.

[Operation of the Hydraulic Damper 1]

FIGS. 4A and 4B are explanatory diagrams of how the hydraulic damper 1 of the first embodiment works. FIG. 4A depicts oil flow during extension of the hydraulic damper 1, and FIG. 4B depicts oil flow during compression of the hydraulic damper 1.

First, an explanation will be given of operation of the hydraulic damper 1 during its extension.

As shown in FIG. 4A, during extension of the hydraulic damper 1, the rod 20 moves to the other side relative to the cylinder 11. At this time, the piston valve 32 continues to close the piston oil ports 311. Further, the movement of the piston unit 30 to the other side reduces the volume of the second oil chamber Y2. As a result, the oil in the second oil chamber Y2 flows out through the cylinder opening 11H into the communication path L.

Then, the oil goes through the communication path L, the outer cylinder body opening 12H, and the connecting channel 52R to flow into the damping force changer 50. In the damping force changer 50, the oil flow within the connecting channel 52R is throttled by the solenoid valve 55. This throttling of the oil flow by the solenoid valve 55 generates a damping force. Thereafter, the oil flows out into the reservoir chamber R.

Also, pressure inside the first oil chamber Y1 becomes relatively lower than that inside the reservoir chamber R. For this reason, oil within the reservoir chamber R flows into the extension-side oil paths 413 of the bottom piston unit 40.

At this time, the check valve 431 of the first embodiment moves to the other side against the spring force of the imparting member 433. The check valve 431 further bends from the outside to the inside in the radial direction. In this way, the check valve 431 not only moves in the axial direction but also bends in opening the extension-side oil paths 413. The oil then flows into the first oil chamber Y1.

As described above, the check valve 431 of the first embodiment not only moves in the axial direction but also bends. Thus, the stress on the check valve 431 is divided into one that causes the check valve 431 to move along with deformation of the imparting member 433, and another one that causes the check valve 431 itself to bend. As a result, the check valve 431 does not move so suddenly as in the case where the check valve 431 only moves without bending itself. This reduces noise accompanying movement of the check valve 431. Also, as compared to the case where the check valve 431 only moves without bending itself, load on the check valve 431 can be reduced.

In the imparting member 433 of the first embodiment, the multiple held parts 433R have different circumferential widths. For this reason, the spring load imparted by the imparting member 433 to the check valve 431 is uneven in the circumferential direction of the check valve 431. As a result, circumferential portions of the check valve 431 leave the round plane 41P at respectively different timings when the check valve 431 opens the extension-side oil paths 413.

In the first embodiment, for example, the fourth structure part 433R4, which has the smallest circumferential width, applies the smallest load on the check valve 431. Also, for example, the first structure part 433R1, which has the largest circumferential width, applies the largest load on the check valve 431.

Thus, a portion of the check valve 431 facing the fourth structure part 433R4 opens (leaves) first, and a portion of the check valve 431 facing the first structure part 433R1 opens (leaves) last.

In this way, circumferential portions of the check valve 431 of the first embodiment move and deform sequentially, and this can reduce occurrence of sounds more effectively.

Then, an explanation will be given of operation of the hydraulic damper 1 during its compression.

As shown in FIG. 4B, during compression of the hydraulic damper 1, the rod 20 moves to the one side relative to the cylinder 11. In the piston unit 30, pressure difference between the first oil chamber Y1 and the second oil chamber Y2 causes the piston valve 32 to open the piston oil ports 311. Thus, the oil within the first oil chamber Y1 flows out through the piston oil ports 311 into the second oil chamber Y2. Here, the rod 20 is present within the second oil chamber Y2. For this reason, the oil flowing from the first oil chamber Y1 into the second oil chamber Y2 is excessive in the amount equal to the volume of the rod 20 within the second oil chamber Y2. Accordingly, the oil in the amount equal to the volume of the rod 20 within the second oil chamber Y2 flows out through the cylinder opening 11H into the communication path L.

Then, the oil goes through the communication path L, the outer cylinder body opening 12H, and the connecting channel 52R to flow into the damping force changer 50. The oil flow within the damping force changer 50 is the same as that during extension of the hydraulic damper 1 as described above.

Also, as a result of the rod 20 moving to the one side relative to the cylinder 11, the oil within the first oil chamber Y1 flows into the compression-side oil paths 412 through the opening 433H of the imparting member 433 and the check valve oil ports 431M (see FIG. 2) in the bottom piston unit 40. The oil having flowed into the compression-side oil paths 412 opens the damping valve 421. The oil then flows out into the reservoir chamber R. That is, depending on the pressure inside the first oil chamber Y1, damping force is generated by both of the oil flow through the cylinder opening 11H into the damping force changer 50 and the oil flow in the bottom piston unit 40.

In particular, the imparting member 433 acts such that, when the hydraulic damper 1 transitions from an extension stroke to a compression stroke, the check valve 431 having been opened during the extension stroke can immediately close the second other-side oil ports P2 at the transition to the compression stroke. This quickly produces a damping force at the initial phase of the compression stroke (in other words, so-called "rising" of the damping force is made faster).

In the first embodiment, the imparting member 433 contacts the check valve 431 at the area outside of the inner round part 415 in the radial direction and inside of the outer round part 416 in the radial direction. This allows the check valve 431 to tightly contact both of the inner round part 415 and the outer round part 416, preventing leakage of oil.

To adjust the damping force by the damping force changer 50, the solenoid valve 55 is controlled by the solenoid unit 51 (see FIG. 1). Specifically, distance between the solenoid valve 55 and the connecting channel member 52 is changed by the solenoid unit 51. As the distance between the solenoid valve 55 and the connecting channel member 52 narrows, the oil flow resistance increases, producing a larger damping force. On the other hand, as the distance between the solenoid valve 55 and the connecting channel member 52 widens, the oil flow resistance decreases, producing a smaller damping force.

Second Embodiment

Figure 5:
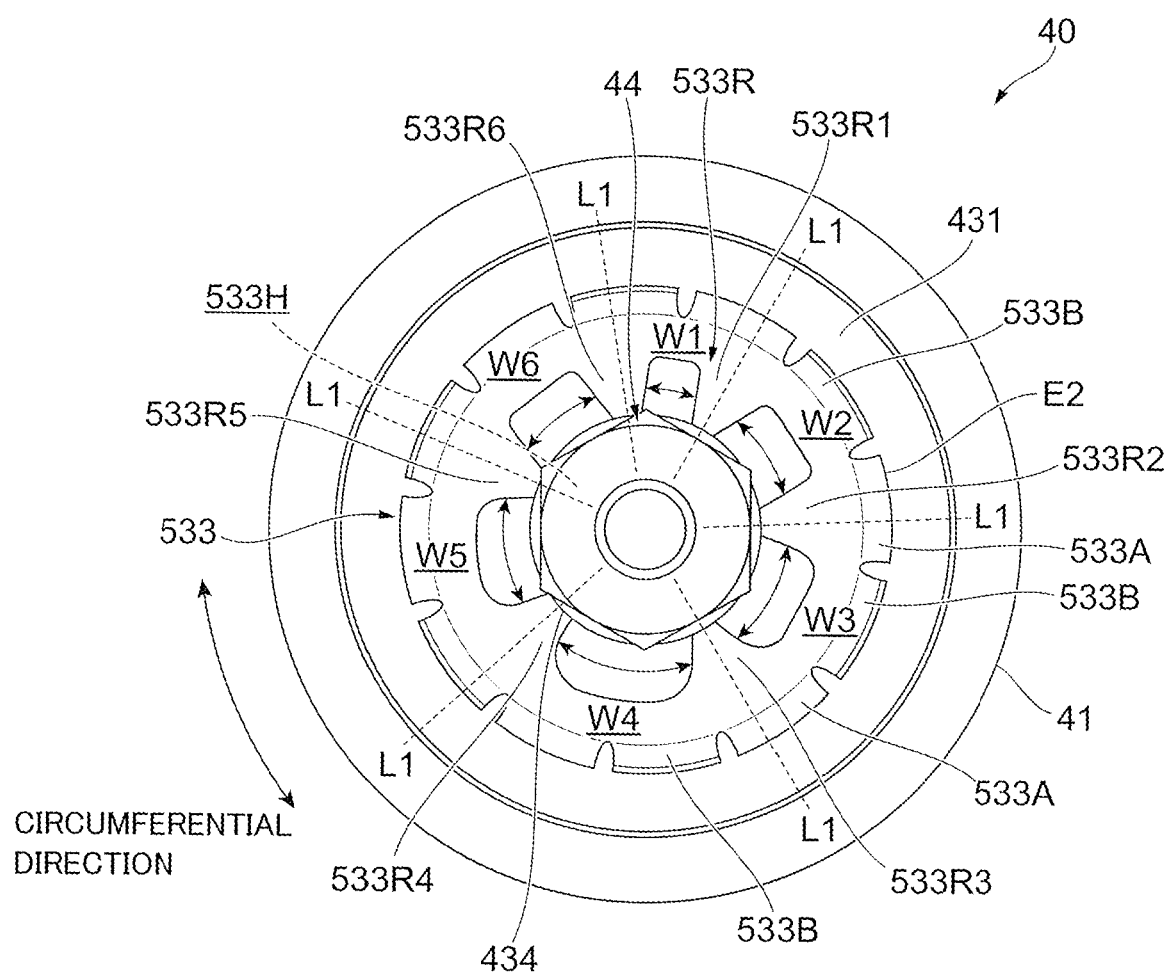
FIG. 5 is an explanatory diagram of the hydraulic damper of the second embodiment.

FIG. 5 is an explanatory diagram of the hydraulic damper 1 of the second embodiment.

In the second embodiment, similar components to those in the first embodiment are denoted by the same reference numerals, and detailed explanation thereof will be omitted.

In the hydraulic damper 1 of the second embodiment, the structure of a second imparting member 533 of the bottom piston unit 40 is different from the imparting member 433 of the first embodiment.

The second imparting member 533 includes an opening 533H at the inside in the radial direction. The opening 533H allows for insertion of the fixing member 44 and the collar member 434. The second imparting member 533 has elasticity. The second imparting member 533 may be made of metal, such as iron.

The second imparting member 533 includes first outer protrusions 533A, second outer protrusions 533B, and held parts 533R.

The first outer protrusions 533A and the second outer protrusions 533B are the same as the first outer protrusions 433A and the second outer protrusions 433B, respectively.

In the second embodiment too, contacting ends E2 of the first outer protrusions 533A contact the check valve 431 at an area that is outside of the inner round part 415 in the radial direction and inside of the outer round part 416 in the radial direction.

The held parts 533R of the second embodiment consist of multiple structure parts. In the description below, these structure parts are respectively referred to as a first structure part 533R1, a second structure part 533R2, a third structure part 533R3, a fourth structure part 533R4, a fifth structure part 533R5, and a sixth structure part 533R6. When these structure parts are not distinguished from each other, they are collectively referred to as the structure parts of the held parts 533R.

The structure parts of the held parts 533R protrude to the inside in the radial direction. Each structure part is tapered such that its circumferential width narrows from the outside in the radial direction toward the inside in the radial direction. The structure parts have substantially the same shape.

The structure parts are arranged such that radial lines L1 passing through the center of the respective structure parts are at different intervals in the circumferential direction. That is, in the second embodiment, circumferential distance between the structure parts of each two adjacent held parts 533R is different from each other. This varies the circumferential strength of the held parts 533R of the second imparting member 533 of the second embodiment. The second imparting member 533 of the second embodiment thus imparts, to the check valve 431, the load that is uneven in the circumferential direction of the check valve 431 and directed toward to the valve seat 41.

Distance between each two adjacent held parts 533R will be described in detail below.

The distance between the sixth structure part 533R6 and the first structure part 533R1 is referred to as a distance W1. The distance between the first structure part 533R1 and the second structure part 533R2 is referred to as a distance W2. The distance between the second structure part 533R2 and the third structure part 533R3 is referred to as a distance W3. The distance between the third structure part 533R3 and the fourth structure part 533R4 is referred to as a distance W4. The distance between the fourth structure part 533R4 and the fifth structure part 533R5 is referred to as a distance W5. The distance between the fifth structure part 533R5 and the sixth structure part 533R6 is referred to as a distance W6.

In the second embodiment, the distance W1 is smaller than distances between other two adjacent held parts 533R. The distance W4 is larger than distances between other two adjacent held parts 533R.

In a clockwise direction of FIG. 5, the distance W1 is smallest, followed by the distance W2, the distance W3, and the distance W4 in this order. In a counterclockwise direction of FIG. 5, the distance W1 is smallest, followed by the distance W6, the distance W5, and the distance W4 in this order. The distance W2 and the distance W6 are substantially the same. The distance W3 and the distance W5 are substantially the same.

As described above, in the second imparting member 533 of the second embodiment, circumferential distance between each two adjacent held parts 533R is different from each other.

In the second imparting member 533 of the second embodiment configured as above, circumferential distance W between each two adjacent held parts 533R are different from each other. For this reason, the spring load imparted by the second imparting member 533 to the check valve 431 is uneven in the circumferential direction of the check valve 431. As a result, circumferential portions of the check valve 431 leave the round plane 41P (see FIG. 3A) at respectively different timings when the check valve 431 opens the extension-side oil paths 413.

In this way, circumferential portions of the check valve 431 of the second embodiment move and deform sequentially, and this can reduce occurrence of sounds more effectively.

Third Embodiment

Figure 6A:
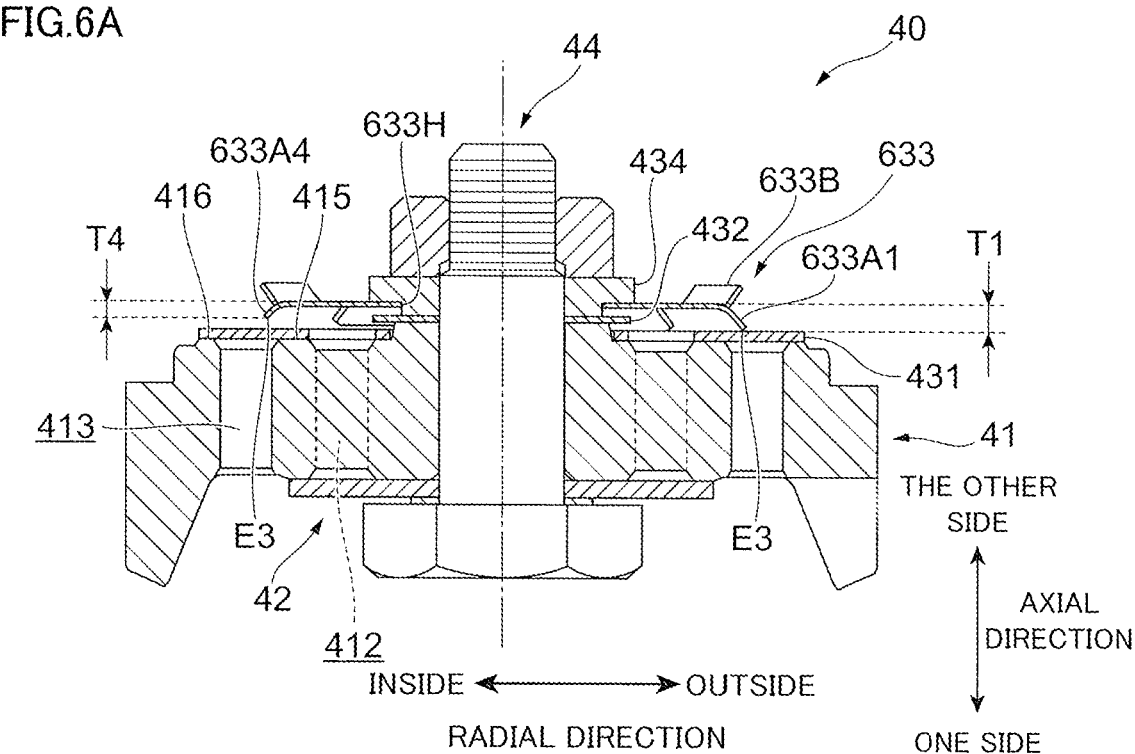
FIGS. 6A and 6B are explanatory diagrams of the hydraulic damper of the third embodiment.
Figure 6B:
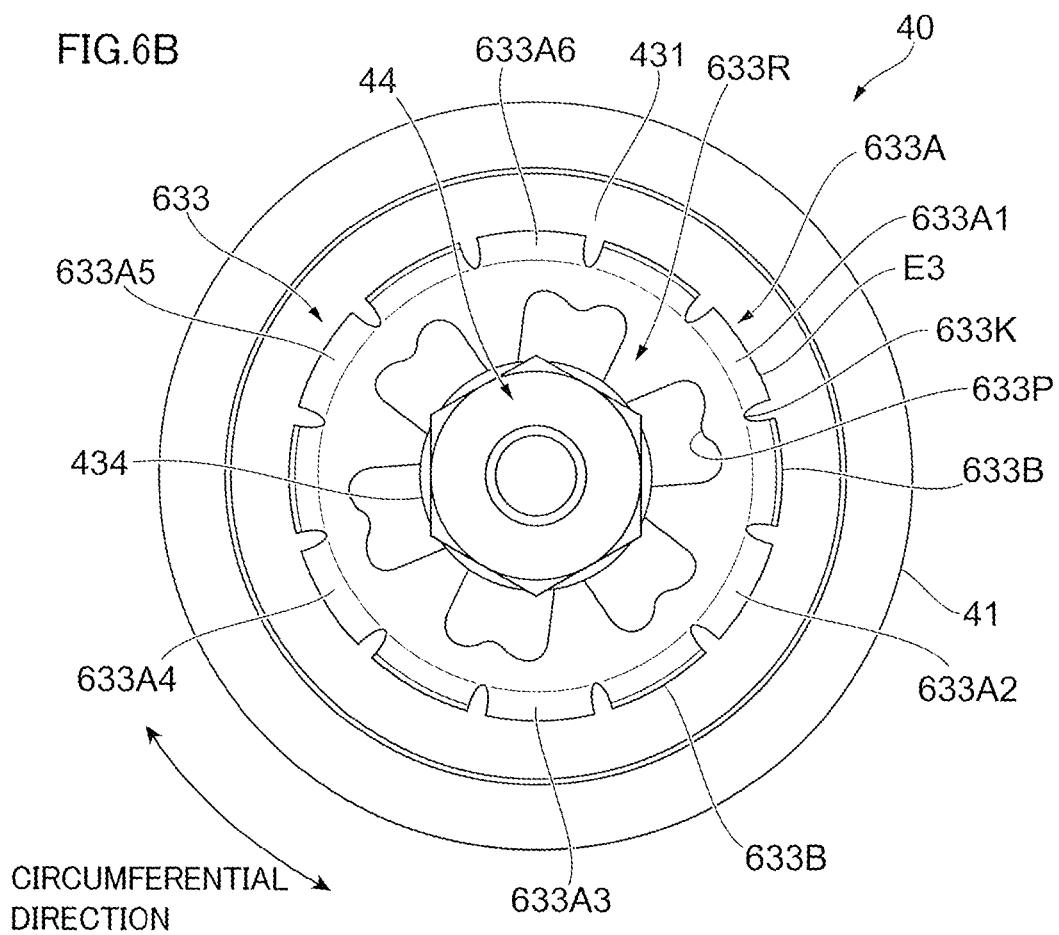

FIGS. 6A and 6B are explanatory diagrams of the hydraulic damper of the third embodiment.

In the third embodiment, similar components to those in the other embodiments are denoted by the same reference numerals, and detailed explanation thereof will be omitted.

In the hydraulic damper 1 of the third embodiment, the structure of a third imparting member 633 of the bottom piston unit 40 is different from the imparting member 433 of the first embodiment.

As shown in FIG. 6A, the third imparting member 633 includes an opening 633H at the inside in the radial direction. The opening 633H allows for insertion of the fixing member 44 and the collar member 434. The third imparting member 633 has elasticity. The third imparting member 633 may be made of metal, such as iron.

As shown in FIG. 6B, the third imparting member 633 includes first outer protrusions 633A, second outer protrusions 633B, held parts 633R, and inner protrusions 633P.

The held parts 633R are the same as the held parts 433R of the first embodiment.

The first outer protrusions 633A consist of multiple structure parts. In the description below, these structure parts are respectively referred to as a first structure part 633A1, a second structure part 633A2, a third structure part 633A3, a fourth structure part 633A4, a fifth structure part 633A5, and a sixth structure part 633A6. When these structure parts are not distinguished from each other, they are collectively referred to as the structure parts of the first outer protrusions 633A.

The structure parts of the first outer protrusions 633A protrude to the outside in the radial direction and to the one side. The structure parts of the first outer protrusions 633A are arranged at substantially equal intervals in the circumferential direction. The structure parts of the first outer protrusions 633A contact the other side surface of the check valve 431 at their contacting ends E3.

As shown in FIG. 6A, in the third embodiment too, the contacting ends E3 contact the check valve 431 at an area that is outside of the inner round part 415 in the radial direction and inside of the outer round part 416 in the radial direction.

In the third embodiment, the structure parts of the first outer protrusions 633A protrude to the one side by different protrusion amounts. In other words, the structure parts of the first outer protrusions 633A have different distances from the check valve 431. The third imparting member 633 of the third embodiment thus imparts, to the check valve 431, the load that is uneven in the circumferential direction of the check valve 431 and directed toward to the valve seat 41. Protrusion amounts of the first outer protrusions 633A to the one side will be described in detail below.

In the third embodiment, as shown in FIG. 6A, the protrusion amount T1 of the first structure part 633A1 is larger than the other first outer protrusions 633A. In other words, the first structure part 633A1 is closest to the check valve 431 among the first outer protrusions 633A. The protrusion amount T4 of the fourth structure part 633A4 is smaller than the other first outer protrusions 633A. In other words, the fourth structure part 633A4 is most distant from the check valve 431 among the first outer protrusions 633A.

In a clockwise direction of FIG. 6B, in terms of protrusion toward the one side, the protrusion amount T1 of the first structure part 633A1 is largest, followed by the protrusion amount of the second structure part 633A2, the protrusion amount of the third structure part 633A3, and the protrusion amount T4 of the fourth structure part 633A4 in this order.

In a counterclockwise direction of FIG. 6B, in terms of protrusion toward the one side, the protrusion amount T1 of the first structure part 633A1 is largest, followed by the protrusion amount of the sixth structure part 633A6, the protrusion amount of the fifth structure part 633A5, and the protrusion amount T4 of the fourth structure part 633A4 in this order.

The protrusion amounts of the second structure part 633A2 and the sixth structure part 633A6 are substantially the same. Also, the protrusion amounts of the third structure part 633A3 and the fifth structure part 633A5 are substantially the same.

The second outer protrusions 633B protrude to the opposite side from the first outer protrusions 633A in the axial direction, and have the same basic structure as the first outer protrusions 633A.

Multiple inner protrusions 633P protrude to the inside in the radial direction. The protrusion amount of the inner protrusions 633P is smaller than that of the held parts 633R.

Each inner protrusion 633P is provided between two adjacent outer protrusions, namely between one of the first outer protrusions 633A and one of the second outer protrusions 633B. That is, each inner protrusion 633P is positioned to face a corresponding notch 633K. More specifically, each inner protrusion 633P is aligned with the corresponding notch 633K in the radial direction.

In the third imparting member 633 of the third embodiment, the held parts 633R and the inner protrusions 633P are positioned to face the respective notches 633K each between the adjacent first outer protrusion 633A and second outer protrusion 633B. This reduces stress concentration in the notches 633K.

In the third imparting member 633 of the third embodiment configured as above, the multiple structure parts of the first outer protrusions 633A protrude to the one side by different protrusion amounts. That is, the multiple structure parts of the first outer protrusions 633A have different distances from the check valve 431. For this reason, in the third embodiment, the spring load imparted by the third imparting member 633 to the check valve 431 is uneven in the circumferential direction of the check valve 431.

In the bottom piston unit 40 of the third embodiment configured as above, circumferential portions of the check valve 431 leave the round plane 41P (see FIG. 3A) at respectively different timings when the check valve 431 opens the extension-side oil paths 413. In this way, circumferential portions of the check valve 431 of the third embodiment move and deform sequentially, and this can reduce occurrence of sounds more effectively.

Fourth Embodiment

Figure 7:
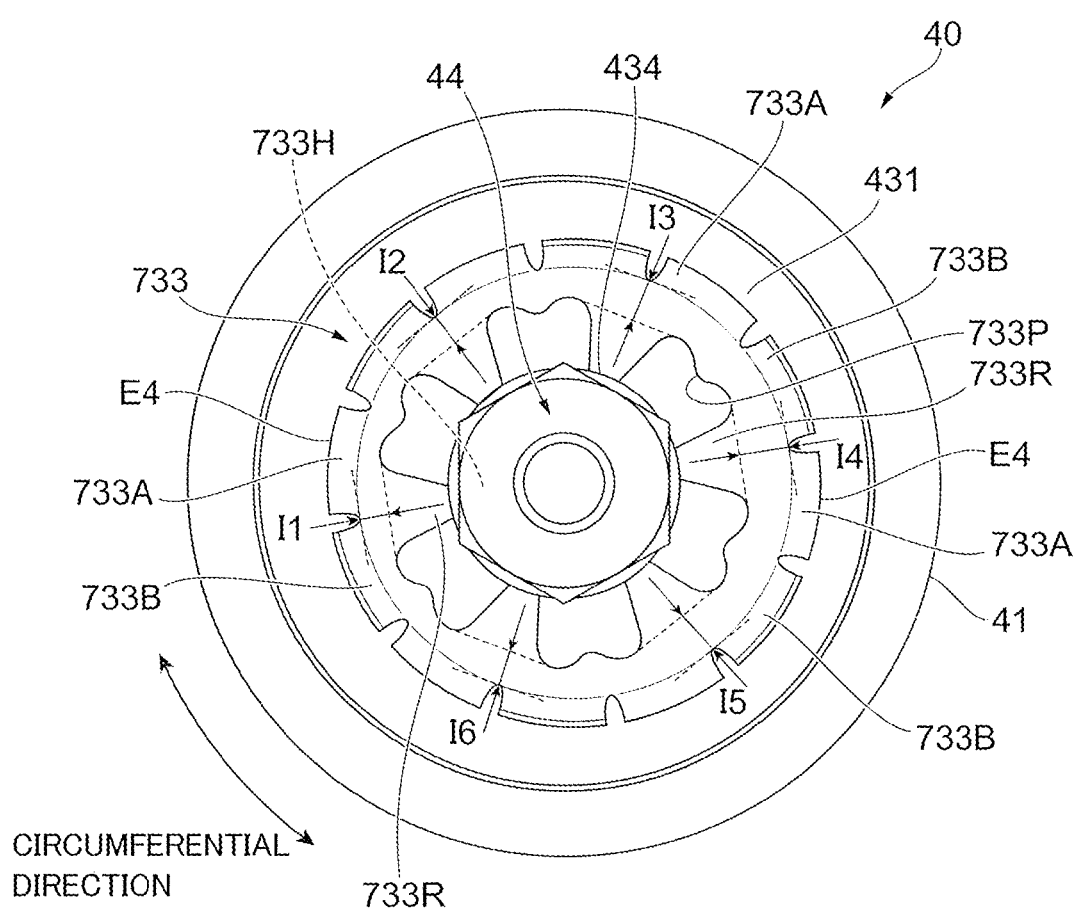
FIG. 7 is an explanatory diagram of the hydraulic damper of the fourth embodiment.

FIG. 7 is an explanatory diagram of the hydraulic damper 1 of the fourth embodiment.

In the fourth embodiment, similar components to those in the other embodiments are denoted by the same reference numerals, and detailed explanation thereof will be omitted.

In the hydraulic damper 1 of the fourth embodiment, the structure of a fourth imparting member 733 of the bottom piston unit 40 is different from the imparting member 433 of the first embodiment.

As shown in FIG. 7, the fourth pressing member 733 includes an opening 733H at the inside in the radial direction. The opening 733H allows for insertion of the fixing member 44 and the collar member 434. The fourth imparting member 733 has elasticity. The fourth imparting member 733 may be made of metal, such as iron.

The fourth imparting member 733 includes first outer protrusions 733A, second outer protrusions 733B, held parts 733R, and inner protrusions 733P.

The first outer protrusions 733A, the second outer protrusions 733B, and the inner protrusions 733P are the same as the first outer protrusions 633A, the second outer protrusions 633B, and the inner protrusions 633P of the third embodiment, respectively.

The held parts 733R protrude to the inside in the radial direction. Each held part 733R is tapered such that its circumferential width narrows from the outside in the radial direction toward the inside in the radial direction. Multiple held parts 733R are arranged at substantially equal intervals in the circumferential direction. The held parts 733R have substantially the same shape.

Radially inward portions of the held parts 733R are held between the check valve stopper 432 and the collar member 434.

In the fourth embodiment, distances I each between one of the held parts 733R and the corresponding first and second outer protrusions 733A, 733B are different from each other in the circumferential direction. That is, the multiple held parts 733R of the fourth embodiment can be regarded as having different lengths.

Specifically, a first distance 11 is smaller than the other distances I. Also, a fourth distance 14 is larger than the other distances I.

In a clockwise direction of FIG. 7, the first distance 11 is smallest, followed by a second distance 12, a third distance 13, and the fourth distance 14 in this order. In a counterclockwise direction of FIG. 7, the first distance 11 is smallest, followed by a sixth distance 16, a fifth distance 15, and the fourth distance 14 in this order.

The second distance 12 and the sixth distance 16 are substantially the same. The third distance 13 and the fifth distance 15 are substantially the same.

Thus, in the fourth embodiment, radial positions of the contacting ends E4 of the respective first outer protrusions 733A to contact the check valve 431 are different from each other in the circumferential direction. In other words, in the fourth embodiment, contacting positions of the respective first outer protrusions 733A to contact the check valve 431 are different from each other in the circumferential direction. The fourth imparting member 733 of the fourth embodiment thus imparts, to the check valve 431, the load that is uneven in the circumferential direction of the check valve 431 and directed toward to the valve seat 41.

In the fourth embodiment too, the contacting ends E4 of the respective first outer protrusions 733A contact the check valve 431 (see FIG. 2) at an area that is outside of the inner round part 415 in the radial direction and inside of the outer round part 416 in the radial direction.

In the fourth imparting member 733 of the fourth embodiment configured as above, radial positions of the respective first outer protrusions 733A are different from each other. For this reason, the spring load imparted by the fourth imparting member 733 to the check valve 431 is uneven in the circumferential direction of the check valve 431. Thus, circumferential portions of the check valve 431 leave the round plane 41P (see FIG. 3A) at respectively different timings when the check valve 431 opens the extension-side oil paths 413.

In this way, circumferential portions of the check valve 431 of the fourth embodiment move and deform sequentially, and this can reduce occurrence of sounds more effectively.

Fifth Embodiment

Figure 8A:
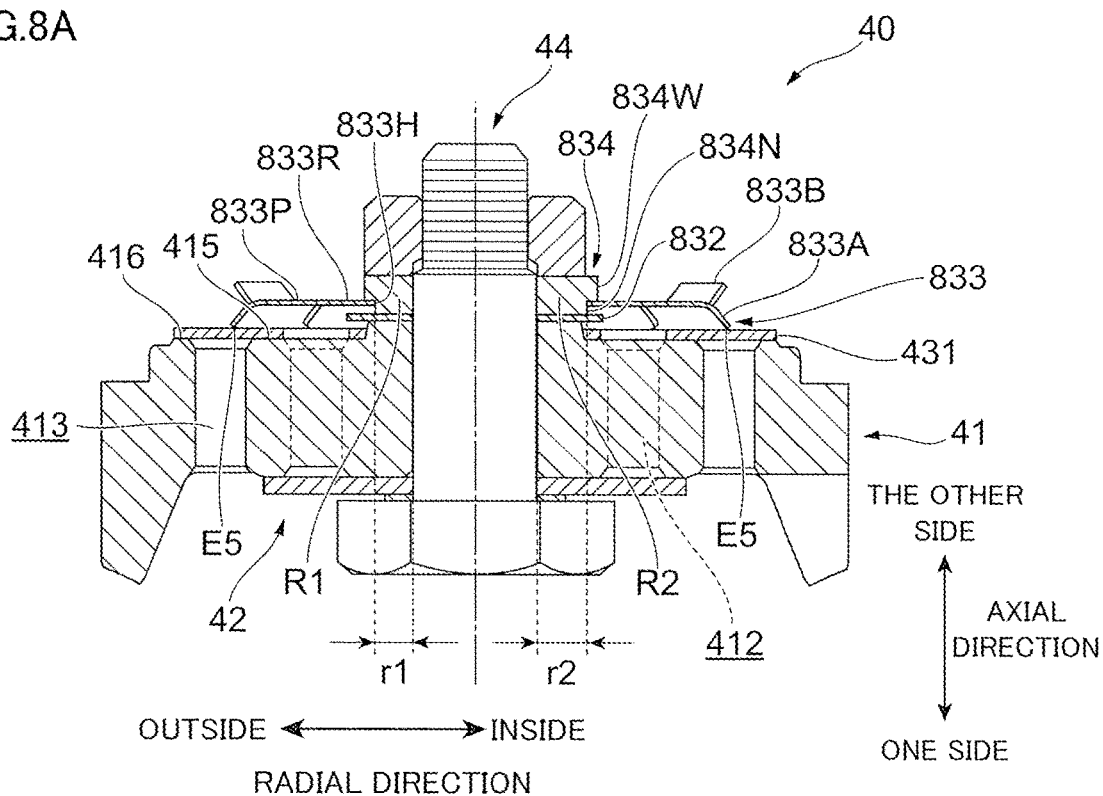
FIGS. 8A and 8B are explanatory diagrams of the hydraulic damper of the fifth embodiment.
Figure 8B:
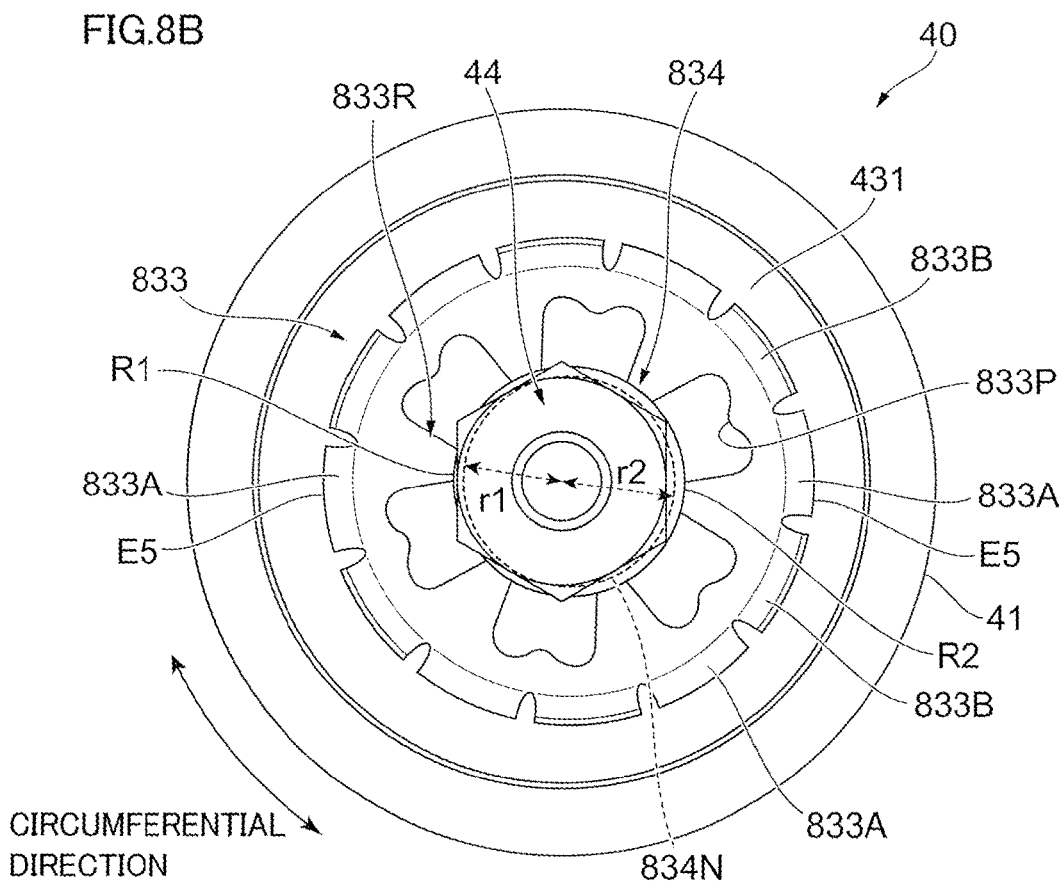

FIGS. 8A and 8B are explanatory diagrams of the hydraulic damper 1 of the fifth embodiment.

In the fifth embodiment, similar components to those in the other embodiments are denoted by the same reference numerals, and detailed explanation thereof will be omitted.

In the hydraulic damper 1 of the fifth embodiment, the structures of a fifth imparting member 833 and a collar member 834 of the bottom piston unit 40 are different from those of the imparting member 433 and the collar member 434 of the first embodiment.

As shown in FIG. 8A, the fifth imparting member 833 includes an opening 833H at the inside in the radial direction. The opening 833H allows for insertion of the fixing member 44 and the collar member 834. The fifth imparting member 833 has elasticity. The fifth imparting member 833 may be made of metal, such as iron.

As shown in FIG. 8B, the fifth imparting member 833 includes first outer protrusions 833A, second outer protrusions 833B, held parts 833R, and inner protrusions 833P.

The first outer protrusions 833A and the second outer protrusions 833B are the same as the first outer protrusions 433A and the second outer protrusions 433B, respectively, of the first embodiment. Also, the held parts 833R and the inner protrusions 833P are the same as the held parts 633R and the inner protrusions 633P, respectively, of the third embodiment. That is, the fifth imparting member 833 includes: substantially the same-shaped first outer protrusions 833A arranged at substantially equal intervals; substantially the same-shaped second outer protrusions 833B arranged at substantially equal intervals; substantially the same-shaped held parts 833R arranged at substantially equal intervals; and substantially the same-shaped inner protrusions 833P arranged at substantially equal intervals.

As shown in FIG. 8A, the collar member 834 includes a small-diameter portion 834N, and a large-diameter portion 834W at the other side of the small-diameter portion 834N.

In the fifth embodiment, distance from the center (e.g., the center of the fixing member 44, the valve seat 41, and the check valve 431 in the radial direction) to the outer periphery of the small-diameter portion 834N is uneven in the circumferential direction. That is, a circle around the periphery of the small-diameter portion 834N is eccentric to the center. Specifically, the small-diameter portion 834N includes a first small-diameter portion R1 and a second small-diameter portion R2 at a position different from the first small-diameter portion R1 in the circumferential direction. The radial length of the first small-diameter portion R1 is a distance r1, and the radial length of the second small-diameter portion R2 is a distance r2 that is longer than the distance r1.

The small-diameter portion 834N contacts the held parts 833R of the fifth imparting member 833 in the radial direction, whereby the small-diameter portion 834N defines a radial position of the fifth imparting member 833.

In the fifth imparting member 833 of the fifth embodiment, the contacting ends E5 of the respective first outer protrusions 833A contact the check valve 431 at radial positions different from each other. The fifth imparting member 833 of the fifth embodiment thus imparts, to the check valve 431, the load that is uneven in the circumferential direction of the check valve 431 and directed toward to the valve seat 41.

In the fifth embodiment too, the contacting ends E5 of the respective first outer protrusions 833A contact the check valve 431 at an area that is outside of the inner round part 415 in the radial direction and inside of the outer round part 416 in the radial direction.

In the bottom piston unit 40 of the fifth embodiment configured as above, circumferential portions of the check valve 431 leave the round plane 41P (see FIG. 3A) at respectively different timings when the check valve 431 opens the extension-side oil paths 413. In this way, circumferential portions of the check valve 431 of the fifth embodiment move and deform sequentially, and this can reduce occurrence of sounds more effectively.

Sixth Embodiment

FIG. 9 is an explanatory diagram of the hydraulic damper of the sixth embodiment.

In the sixth embodiment, similar components to those in the other embodiments are denoted by the same reference numerals, and detailed explanation thereof will be omitted.

In the hydraulic damper 1 of the sixth embodiment, the structures of a sixth imparting member 991 and a nut 942 (an example of the holding part) of a fixing member 944 of the bottom piston unit 40 are different from those of the imparting member 433 and the nut 442 of the fixing member 44 of the first embodiment.

The sixth imparting member 991 is a substantially disk-like member including an opening 991H at the inside in the radial direction. The opening 991H allows for insertion of the fixing member 944. The sixth imparting member 991 further includes oil ports 991Y permitting the flow of oil, and an annular portion 991R including a contacting end E6 to contact the check valve 431. As described below, the sixth imparting member 991 imparts, to the check valve 431, the load that is uneven in the circumferential direction of the check valve 431 and directed toward to the valve seat 41.

In the sixth embodiment too, the contacting ends E6 contact the check valve 431 at an area that is outside of the inner round part 415 in the radial direction and inside of the outer round part 416 in the radial direction.

The height of one side surface 942M of the nut 942 is uneven in the circumferential direction. That is, a first surface M1 in the one side surface 942M projects toward the one side by a first projection amount H1, as measured from a virtual line VL (e.g., the line flush with the other side surface 942L of the nut 942). Meanwhile, a second surface M2 located at a different position from the first surface M1 in the circumferential direction projects toward the one side by a second projection amount H2, which is larger than the first projection amount H1, as measured from the virtual line VL. In other words, distance from the nut 942 to the sixth imparting member 991 and the check valve 431 is uneven in the circumferential direction.

In the bottom piston unit 40 of the sixth embodiment configured as above, circumferential portions of the check valve 431 leave the round plane 41P (see FIG. 3A) at respectively different timings when the check valve 431 opens the extension-side oil paths 413. In this way, circumferential portions of the check valve 431 of the sixth embodiment move and deform sequentially, and this can reduce occurrence of sounds more effectively.

Modified Example

Figure 10:
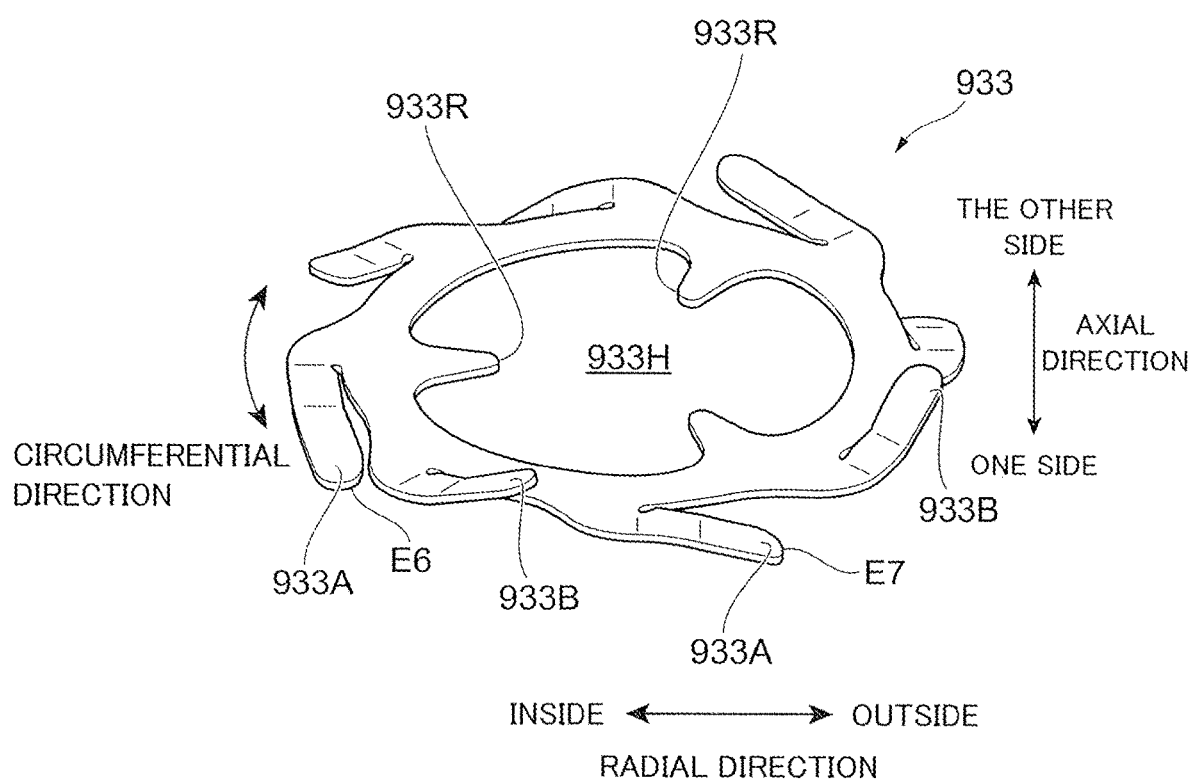
FIG. 10 is an explanatory diagram of an imparting member of a modified example.

FIG. 10 is an explanatory diagram of an imparting member 933 of a modified example.

As shown in FIG. 10, the imparting member 933 of the modified example includes an opening 933H, first circumferential protrusions 933A, second circumferential protrusions 933B, and held parts 933R.

The first circumferential protrusions 933A circumferentially protrude to the one side. The multiple first circumferential protrusions 933A are arranged at substantially equal intervals in the circumferential direction. The first circumferential protrusions 933A contact the other side surface of the check valve 431 at their contacting ends E7.

The contacting ends E7 of the first circumferential protrusions 933A of the imparting member 933 of the modified example are located in an area that is outside of the inner round part 415 in the radial direction and inside of the outer round part 416 in the radial direction (see FIG. 3A).

The second circumferential protrusions 933B circumferentially protrude to the other side.

The imparting member 933 of the modified example configured as above may be used instead of the imparting members of the above first to sixth embodiments.

The multiple structure parts of, for example, the held parts 433R of the first embodiment may each have a different thickness, so that the strength of the held parts 433R is varied in the circumferential direction.

The structure of the held parts (the held parts 433R and the held parts 533R) of the first and second embodiments, whereby the strength of the held parts is varied in the circumferential direction, may be applied to the outer protrusions of each embodiment. For example, width, distance and thickness may be varied among the multiple outer protrusions, so that the imparting member imparts, to the check valve 431, the load that is uneven in the circumferential direction of the check valve 431 and directed toward to the valve seat 41.

Alternatively, the multiple outer protrusions of the imparting member of the first to sixth embodiments may each have a different radial length (the amount of protrusion toward the outside in the radial direction), so that the imparting member imparts, to the check valve 431, the load that is uneven in the circumferential direction of the check valve 431 and directed toward to the valve seat 41.

In the first embodiment for example, the second outer protrusions 433B protruding in a direction away from the check valve 431 are not essential. The first outer protrusions 433A may be provided instead of the second outer protrusions 433B such that the first outer protrusions 433A are arranged at certain intervals along the entire outer periphery of the imparting member 433 in the circumferential direction. The same applies to the other embodiments and the modified example.

The configuration of the bottom piston unit 40 in the first to the sixth embodiments is applicable to the piston unit 30, which partitions the space inside the cylinder 11 into the first oil chamber Y1 and the second oil chamber Y2 and moves along with movement of the rod 20. Specifically, the spring 33 and the piston valve 32 of the piston unit 30 may be replaced with the check valve unit 43 of the bottom piston unit 40.

Although the hydraulic damper 1 of the first to the sixth embodiments has a so-called triple tube structure, the foregoing embodiments are applicable to a so-called double tube structure.

The structure of the bottom piston unit 40 of the first embodiment may be installed in an outside oil storage part provided separately from the cylinder unit 10. In this case, the outside oil storage part may generate damping force against the oil flow that accompanies movement of the rod 20 in the cylinder unit 10.

REFERENCE SIGNS LIST

1 Hydraulic damper
11 Cylinder (an example of the cylinder)
20 Rod (an example of the rod)
40 Bottom piston unit
41 Valve seat (an example of the piston)
431 Check valve (an example of the valve)
432 Check valve stopper (an example of the restricting part)
433 Imparting member (an example of the imparting part)

The invention claimed is:

1. A hydraulic damping device comprising:
a cylinder storing fluid;
a piston configured to form a channel through which the fluid flows along with relative movement of a rod relative to the cylinder in a specific direction;
a valve having elasticity, the valve being configured to open and close the channel in the piston;
a movement permitting part configured to permit the valve to move between a contact position and a spaced position, the contact position being a position where the valve contacts the piston, the spaced position being a position where the valve is spaced from the piston;
an imparting part having elasticity, the imparting part being configured to impart, to the valve, a load that is uneven in a circumferential direction of the valve and directed toward the piston; and
a restricting part separate from the imparting part, the restricting part being configured to annularly contact the valve at the spaced position to thereby restrict the valve from moving farther from the spaced position relative to the piston radially inside of the valve,
wherein the imparting part comprises multiple held parts having different circumferential widths therebetween, and
each of the multiple held parts protrudes radially inward and is configured to apply the load to the valve.

2. A hydraulic damping device comprising:
a cylinder storing fluid;
a piston configured to form a channel through which the fluid flows along with relative movement of a rod relative to the cylinder in a specific direction;
a valve having elasticity, the valve being configured to open and close the channel in the piston;
a movement permitting part configured to permit the valve to move between a contact position and a spaced position, the contact position being a position where the valve contacts the piston, the spaced position being a position where the valve is spaced from the piston;
a restricting part configured to restrict the valve from moving farther from the spaced position relative to the piston; and
an imparting part having elasticity, the imparting part being configured to impart, to the valve, a load that is uneven in a circumferential direction of the valve and directed toward the piston,
wherein the imparting part includes a contact portion, an inner protrusion and multiple held parts, the contacting portion being configured to contact the valve and including a plurality of outer protrusions extending radially outward, the inner protrusion protruding radially inward and located between adjacent two of the plurality of outer protrusions, the multiple held parts having different circumferential widths therebetween, and
each of the multiple held parts protrudes radially inward and is configured to apply the load to the valve.

* * * * *